Nov. 26, 1957 S. RUBEN 2,814,663

PRIMARY CELL

Filed May 7, 1956

INVENTOR
Samuel Ruben
BY
ATTORNEY

United States Patent Office 2,814,663
Patented Nov. 26, 1957

2,814,663
PRIMARY CELL
Samuel Ruben, New Rochelle, N. Y.
Application May 7, 1956, Serial No. 583,028
16 Claims. (Cl. 136—119)

This invention relates to electric current producing primary dry cells, and, more particularly, to a galvanic cell utilizing a compound of mercury as its depolarizer.

Objects of the invention are to provide a primary cell having a high ratio of current output capacity to cell volume, a relatively high ratio of current output above accepted cut-off voltage to total current output capacity, a substantially sustained voltage or flat voltage discharge curve with continuous output throughout a relatively long cell life, and a relatively long shelf or open circuit life without undue internal deterioration.

Figure 1:
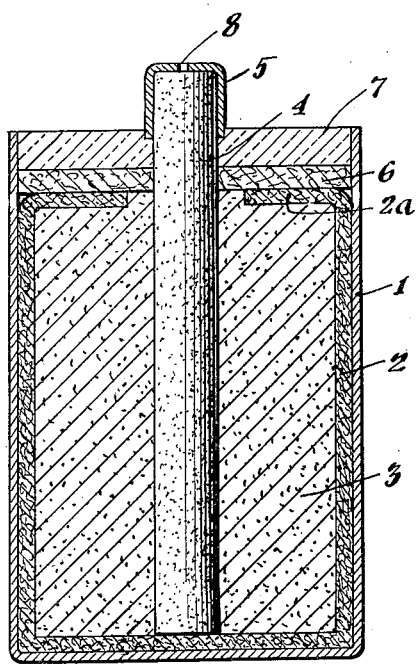
Figure 2:
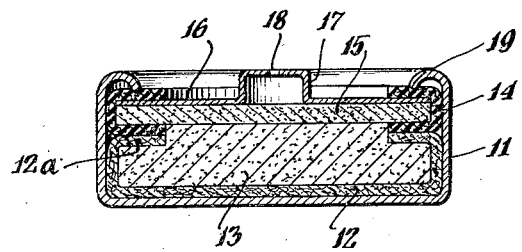

Other and further objects and advantages of the invention will become apparent from the following description and from the accompanying drawing, in which:

Fig. 1 is a longitudinal sectional view, having parts in elevation, of a cell structure embodying the invention; and Fig. 2 is a sectional view of a modified embodiment of the invention into a flat type cell.

The compounds of mercury when used as depolarizer electrodes in primary cells provide high ampere hour capacity in a small volume, due to the high density of such compounds and due to the fact that such compounds are readily reduced to a metallic state without the formation of intermediate compounds which are inactive or have a lower potential, as is the case when manganese dioxide is used as a depolarizer in neutral electrolytes.

Mercuric oxide is successfully used as a depolarizer in commercial cells and batteries, the electrolyte being an alkaline solution having a negligible dissolving action on the mercuric oxide, as exemplified in my Patent No. 2,422,045. Cells of this general type usually require special structures to positively prevent leakage of the corrosive electrolyte.

The relatively inexpensive structures characteristic of standard zinc-carbon-manganese dioxide cells are possible as a result of the use of a neutral or non-corrosive electrolyte, such as sal ammoniac. To use such structures with a reducible metal compound, specifically with a mercury compound, it is essential that the compound be stable in the electrolyte and be ionically reducible. Mercuric oxide, although stable in neutral electrolytes, produces a low voltage and quickly polarizes on load.

It has been already attempted in the past to use mercuric sulfate as a depolarizer in certain type cells in combination with a sulfate salt electrolyte. However, mercuric sulfate would hydrolize in an aqueous electrolyte, forming a basic precipitate and sulfuric acid, which caused quick corrosion of the zinc anode and also dissolved the basic precipitate so that sufficient capacity and shelf life necessary for a practical primary cell could not be obtained. In some cases, as suggested in the Heil U. S. Patent No. 941,416, a minor amount of mercuric oxide was added to the mercuric sulfate in an attempt to counteract the corrosive effect of the sulfuric acid formed, without, however, eliminating the difficulty. Also, when these prior depolarizers, in the usual admixture with finely divided carbon or graphite, were used to form pressed depolarizer bodies or bobbins therefrom, the decomposition of the mercuric sulfate by hydrolysis in the aqueous electrolyte would cause a great change in the volume of the bobbin so that it was impossible to maintain satisfactory electrical contact between the depolarizer and the carbon particles. For these reasons, cells of this type were never successful on a practical and commercial scale.

I have found that the basic sulfate of mercury ($3HgO.SO_3$), such as exemplified mercuric dioxysulfate or by mineral turpeth, constitutes an excellent depolarizer in combination with a cell system comprising a zinc anode and an electrolyte which is relatively inert with respect to the depolarizer. I have further discovered that for the depolarizer of basic mercuric sulfate, aqueous solutions of certain metallic salts of organic acids constitute highly satisfactory electrolytes. The organic acids of which the metallic salts are within the contemplation of the present invention are acetic, tartaric and citric acids and the metals combined with the said acids are the alkali and alkaline earth metals, such as primarily potassium, sodium, lithium, magnesium and zinc. In general, the acetates are more desirable than the salts of the other organic acids and the preferred acetates are magnesium acetate and potassium acetate. For maximum shelf life, it is desirable to add a suitable inhibitor to the electrolyte which prevents local action on the zinc anode. The inhibitor may be a small percentage of a water-soluble chromate, with the exclusion of chromic acid, such as, for example, potassium dichromate.

The concentration of the electrolyte may vary within 10% and 25%, the preferred concentration being between 15% and 20%. Thus, in the case of magnesium acetate or potassium acetate, very satisfactory results are obtained with a concentration of 15%. The concentration of the soluble chromate inhibitor added to the electrolyte may be between 0.5% and 2.5%, an addition of 1% potassium dichromate being very satisfactory for the purpose.

In the preparation of the depolarizer, the basic mercuric sulfate is preferably mixed with carbon or graphite to increase its conductivity and to insure low internal resistance throughout the useful life of the cell, suitable compositions being composed of 5 to 9 parts by weight, preferably 7 parts by weight, of basic mercuric sulfate ($3HgO.SO_3$) and 1 part by weight of Shawinigan carbon black.

Referring now to Fig. 1 of the drawing, illustrating a preferred embodiment of the invention into a structure similar to that of standard zinc-carbon-manganese dioxide cells, reference numeral 1 denotes a zinc can constituting the container and the anode of the cell. The inner surface of can 1 is lined with porous spacer 2 constituted by two layers of Dexter paper 0.002" thick which is impregnated with the electrolyte. The electrolyte is prepared by dissolving 15 grams of magnesium acetate, $Mg(C_2H_3O_2)_2.4H_2O$, in 100 milliliters of water, adding 1% by weight of potassium dichromate, $K_2Cr_2O_7$, to the solution, constituting the inhibitor. The electrolyte is converted into a gel by intimate admixture of 10% by weight of gelatine and 5% by weight of glycerine therewith, preferably at an elevated temperature, such as at 80° C. The paper constituting the spacer 2 is passed through the heated electrolyte solution and dried, whereby it becomes impregnated and also coated with the gel electrolyte formed, which assures good contact of the spacer-electrolyte with the inner surface of the zinc can. I have found that the contact between the spacer-electrolyte layer and the zinc can is further considerably improved by admixing a small percentage of a compatible adhesive, such as about 2% by weight of gum arabic, with the electrolyte-gelatine-glycerine solution, prior to passing the said layer through such solution. This imparts adhesive properties to the spacer-electrolyte layer and is particularly beneficial in maintaining the flash current of the cell at a desired high value.

Depolarizer bobbin 3, weighing 14 grams, is made by milling together a suitable amount of the basic mercuric sulfate and of Shawinigan carbon black in the proportion of 7:1 by weight to form a very intimate mixture and then admixing 6 cubic centimeters of the electrolyte solution having the same composition as the one described in the foregoing, except that it does not contain any gelatine, glycerine, or gum arabic. The depolarizer mix thus obtained is pressed in a die to a diameter smaller than the internal diameter of the can 1 lined with spacer layer 2 and a carbon rod 4 is forced into it while the mix is still in the die. The bobbin, with rod 4 therein, is then placed into the lined can and compression is applied thereto so that it is expanded against the gelatinized electrolyte-spacer layer 2 and presses the same into intimate contact with the zinc can.

The top end portions 2a of paper spacer 2, which are originally in cylindrical form, are folded over the corresponding end of bobbin 3, as shown at 2a, and an apertured wax-impregnated paper fibre disc 6 is pressed down on it. A sealing compound 7 is then poured into the remaining free space at the top of the zinc can to seal the cell.

On top of the carbon rod 4, which has been treated with wax or with a silicone resin to prevent electrolyte creepage, there is provided a tinned brass cap 5, serving as one of the terminals of the cell. Venting is effected through a small hole 8 in metal cap 5.

A cell of the described character has a voltage of 1.38, which renders it useful as a replacement unit for conventional zinc-carbon-manganese dioxide cells, the cell of the present invention having several times the amperehour capacity of such conventional cells of the same size. Due to the inert characteristics of the electrolyte with respect to the depolarizer and anode materials, a long shelf life is obtained.

Fig. 2 illustrates a modified embodiment of the invention into a flat type cell, in which reference numeral 11 designates a zinc cup, the inner surface of which is lined with cup 12 of porous paper impregnated and coated with the gelatinized electrolyte. Within cup 12, there is compressed a body 13 of the depolarizer mix composed of the basic mercuric sulfate and carbon in suitable proportions and impregnated with the electrolyte of the invention, containing a small addition of the inhibitor.

The top mouth portions of the electrolyte-impregnated liner 12 are folded down over the top surface of depolarizer body 13, as shown at 12a, and said surface is in pressure contact with a carbon disc 15, which has been treated with a silicone resin to prevent electrolyte creepage. The carbon disc 15 is in contact with a superposed tinned brass terminal disc 16 of the same diameter, the two discs having an insulating and sealing grommet 14 of varnished paper around the circumferential edges thereof, against which the terminal regions of zinc can 11 are crimped down, as shown at 19. The pressure developed incidental to the crimping operation forces the exposed inner surface of carbon disc 15 into intimate contact with the depolarizer body and is also effective in sealing the cell from the external atmosphere. Preferably, the tinned brass terminal disc 16 is provided with a raised center portion 17 to provide a venting space and to allow stacking and series connection of a plurality of cells. Venting is accomplished through a small aperture 18 provided in the said raised center portion 17.

It will be noted that the present invention provides a number of important practical advantages. Thus, to mention only the most important ones, as a result of the close similarity in structure, the cells of the invention can be readily manufactured on a quantity production scale with automatic machinery currently employed in the manufacture of standard zinc-carbon-manganese dioxide cells. The cells of the invention, due to their voltage, can be used as direct replacements for the said conventional cells and are capable of providing several times the amperehour capacity of such cells having the same size. The electrolyte used is not corrosive and is inert with respect to the basic mercuric sulfate depolarizer and to the anode metal so that the cell of the invention is characterized by long shelf life and any electrolyte leakage, should such occur, would be harmless to the user or to the equipment associated with the cell. Cells embodying the electrolytes of the invention, in combination with a zinc anode and a basic mercuric sulfate depolarizer, are capable of delivering high flash currents which remain close to their initial value even when the active operating periods of the cell are alternating with long periods of inactivity. This is due to the fact that the electrochemical reactions in the cells do not build up layers of polarizing zinc compounds at the interface of the zinc anode and the spacer-electrolyte layer.

Instead of gelatine, other compatible gelling agents may be used with the electrolytes of the invention, such as starch, carboxy-methyl-cellulose, or methyl cellulose.

In the preparation of the depolarizer mix used in the cell system of the invention, it is of great importance to assure direct and intimate contact between the particles of basic mercuric sulfate and those of the carbon. This may be accomplished by milling the basic mercuric sulfate and the carbon together for a period sufficient to obtain fine comminution and intimate mixture of the particles. A depolarizer body made with such a mixture permits complete electrochemical utilization of the basic mercuric sulfate, yielding only metallic mercury as the final reaction product, which explains the long life and efficient operation of the cells of the invention. These new results could not be obtained, or even remotely approached, by using mercuric sulfate and carbon, with or without the addition of mercuric oxide, as these prior depolarizers would hydrolize in an aqueous electrolyte, causing the formation of sulfuric acid in the electrolyte and local corrosion of the zinc anode. Also, prior depolarizers of the described character, when hydrolized, would expand in volume quite considerably, which would destroy the necessary intimate contact between the depolarizer particles and the carbon particles admixed therewith.

Although the present invention has been disclosed in connection with a few preferred embodiments thereof, variations and modifications may be resorted to by those skilled in the art without departing from the principles of the invention. I consider all of these variations and modifications to be within the true spirit and scope of the present invention, as disclosed in the foregoing description and defined by the appended claims.

I claim:

1. An electric current producing cell comprising a zinc anode, a cathode depolarizer comprising mercuric dioxysulfate, and an electrolyte consisting preponderantly of an aqueous solution of a metal salt of an organic acid selected from the group consisting of the acetates, tartrates and citrates of alkali and alkaline earth metals.

2. An electric current producing cell comprising a zinc anode, a cathode depolarizer essentially composed of mercuric dioxysulfate, and an electrolyte essentially composed of an aqueous solution of a metal salt of an organic acid selected from the group consisting of the acetates, tartrates and citrates of alkali and alkaline earth metals, the concentration of said electrolyte being between 10% and 25%.

3. An electric current producing cell comprising a zinc anode, a cathode depolarizer of mercuric dioxysulfate intimately admixed with a minor proportion of carbon, and an aqueous electrolyte essentially composed of a metal salt of an organic acid selected from the group consisting of the acetates, tartrates and citrates of alkali and alkaline earth metals and also containing a small percentage of an inhibitor in an amount sufficient to reduce open circuit reactivity of the electrolyte with the anode metal.

4. A primary cell comprising a zinc anode, a cathode depolarizer of mercuric dioxysulfate intimately admixed with a minor proportion of carbon, and an electrolyte composed of an aqueous solution of a metal salt of an organic acid selected from the group consisting of the acetates, tartrates and citrates of alkali and alkaline earth metals and of a soluble chromate inhibitor, the concentration of said metal salt being between 10% and 25% and the concentration of said inhibitor being between 0.5% and 2.5%.

5. A primary cell comprising a zinc anode, a cathode depolarizer composed of mercuric dioxysulfate intimately admixed with a minor proportion of carbon, and an electrolyte composed of an aqueous solution of an acetate selected from the group consisting of alkali metal acetates and alkaline earth metal acetates and also containing a soluble chromate inhibitor in an amount sufficient to substantially prevent open circuit reactivity of the electrolyte with the zinc anode.

6. The primary cell as claimed in claim 5, in which the electrolyte is essentially composed of magnesium acetate.

7. The primary cell as claimed in claim 5, in which the electrolyte is essentially composed of potassium acetate.

8. A primary cell comprising a zinc anode, a cathode depolarizer composed of 5 to 9 parts by weight of mercuric dioxysulfate intimately admixed with 1 part by weight of finely divided carbon, and an electrolyte of an aqueous solution of magnesium acetate having a concentration between 10% and 25% containing a small percentage of soluble chromate inhibitor.

9. A primary cell comprising a zinc anode, a cathode depolarizer composed of about 7 parts by weight of mercuric dioxysulfate intimately admixed with about 1 part by weight of finely divided carbon, and an electrolyte composed of an aqueous solution of magnesium acetate having a concentration of about 15% containing about 1% by weight of potassium dichromate.

10. A primary dry cell comprising a zinc anode, a cathode depolarizer comprising mercuric dioxysulfate, a porous spacer layer interposed between said anode and said cathode depolarizer, and an electrolyte impregnating said layer consisting preponderantly of an aqueous solution of a salt selected from the group consisting of the acetates, tartrates and citrates of a metal selected from the group consisting of potassium, sodium, lithium, magnesium and zinc containing an inhibitor, a gelling agent, and a compatible adhesive.

11. A primary dry cell comprising a zinc anode, a cathode depolarizer of mercuric dioxysulfate intimately admixed with a minor proportion of carbon, a porous spacer layer interposed between said anode and said cathode depolarizer, and an electrolyte impregnating said layer essentially composed of an aqueous solution of a metal salt of an organic acid selected from the group consisting of the acetates, tartrates and citrates of alkali and alkaline earth metals and of a soluble chromate inhibitor, said electrolyte being in admixture with a compatible gelling agent and with a small percentage of gum arabic.

12. A primary dry cell comprising a zinc anode can, a porous spacer layer lining said can, a compressed cathode depolarizer body composed of mercuric dioxysulfate in intimate admixture with a minor amount of finely divided carbon in contact with said layer, and an electrolyte composed of magnesium acetate and containing a small percentage of potassium dichromate impregnating said cathode depolarizer, said electrolyte combined with a compatible gelling agent also impregnating and coating said spacer layer.

13. A primary dry cell comprising a zinc anode can, a porous spacer layer lining said can, a compressed cathode depolarizer body essentially composed of mercuric dioxysulfate in contact with said layer, an electrolyte impregnating said depolarizer body and combined with a compatible gelling agent also impregnating and coating said spacer layer, said electrolyte being essentially composed of a salt selected from the group consisting of the acetates, tartrates and citrates of a metal selected from the group consisting of potassium, sodium, lithium, magnesium and zinc, a carbon disc resting on and in contact with said depolarizer body, a metal disc superposed on said carbon disc, and an insulating sealing grommet around the circumferential edges of said discs and under compression by the crimped down mouth portions of the can.

14. A primary dry cell comprising a zinc anode can, a porous spacer layer lining said can, a compressed cathode depolarizer body essentially composed of mercuric dioxysulfate in contact with said layer, an electrolyte admixed with said depolarizer body and in combination with a compatible gelling agent impregnating and coating said spacer layer, said electrolyte being essentially composed of a salt selected from the group consisting of the acetates, tartrates and citrates of a metal selected from the group consisting of potassium, sodium, lithium, magnesium and zinc, a carbon disc resting on and in contact with said depolarizer body, a metal disc superposed on said carbon disc, and an insulating sealing grommet around the circumferential edges of said discs and under compression by the crimped down mouth portions of the can, said metal disc being formed with a raised center portion having an aperture therein and defining a venting space in communication with the external atmosphere.

15. A primary dry cell comprising a zinc anode can constituting one terminal of the cell, a porous spacer layer lining said can, a compressed cathode depolarizer body composed of an intimate mixture of mercuric dioxysulfate with a minor amount of carbon in contact with said layer, an electrolyte admixed with said depolarizer and in combination with a compatible gelling agent impregnating and coating said spacer layer, said electrolyte being essentially composed of a salt selected from the group consisting of the acetates, tartrates and citrates of a metal selected from the group consisting of potassium, sodium, lithium, magnesium and zinc, a carbon disc resting on and in contact with said depolarizer body, a metal disc superposed on said carbon disc, and an insulating grommet around the circumferential edges of said discs and under sealing compression by the crimped down mouth portions of the can, said metal disc being formed with a raised apertured center portion defining a venting space in communication with the external atmosphere and constituting the other terminal of the cell.

16. An electric current producing cell comprising a zinc anode, a cathode depolarizer comprising mercuric dioxysulfate, and an electrolyte consisting preponderantly of an aqueous solution of a salt selected from the group consisting of the acetates, tartrates and citrates of a metal selected from the group consisting of magnesium and zinc.

References Cited in the file of this patent

UNITED STATES PATENTS

| 669,834 | Hussey | Mar. 12, 1901 |
| 1,008,860 | Peek | Nov. 14, 1911 |
| 1,427,011 | Orsolino | Aug. 22, 1922 |
| 1,839,498 | Porth | Jan. 5, 1932 |

FOREIGN PATENTS

| 20,528 | Great Britain | 1898 |

OTHER REFERENCES

Mellor, J. W.: A Comprehensive Treatise on Inorganic and Theoretical Chemistry, vol. IV, pp. 969–75, Longmans, Green & Co., London, 1946.